3,461,047
TANTALUM PURIFICATION MEANS
Alfred L. Jenny, Columbia, S.C., assignor to the United
States of America as represented by the Secretary of the
Navy
No Drawing. Filed June 18, 1965, Ser. No. 465,216
Int. Cl. C23f *17/00;* C22b *51/00*
U.S. Cl. 204—37                                   2 Claims

ABSTRACT OF THE DISCLOSURE

Method of purifying carbon containing metals of the group consisting of tantalum and niobium for use thereof as electrical components of minimal current leakage. The method comprises anodizing the metal, heating it at about 1850° C. for about 30 minutes, and then heating it at above 2100° C. for about 30 minutes.

---

This invention involves a method of treating tantalum or niobium natural metals in order to remove or reduce the carbon content so that the metals may be used as electrical components with a minimum of current leakage.

It is known that carbon can be removed from tantalum and niobium, in order to reduce current leakage, by using oxides and this has been accomplished in the prior art by mixing tantalum powder and finely divided oxides to form a sintered mass and it is also known to apply an oxide film on the metals by anodizing a metal sample or pellet.

The present invention consists in first anodizing a metal sample containing carbon such as natural tantalum or niobium which may be in pellet form in order to coat the sample with an oxide film. Following the anodizing step the metal is then heated in a vacuum under proper time and temperature conditions to cause the carbon and oxide to react to form the metal and carbon monoxide until there is no detectable amount of carbon in the sample. It has been found that an anodized tantalum or niobium sample if first heated for upwardly of 30 minutes at around 1850° C. and then followed by a second heating step for about 30 minutes at around 2100° C. will have its carbon content reduced to a value that is not detectable by the most sensitive analytical methods.

Before the sample is anodized it will be solvent cleaned in order to remove oil, grease, and some carbon to reduce current leakage. This step is followed by a more rigorous cleaning by using, for example, hydrofluoric acid wherein more carbon is removed and the current leakage further reduced. Anodizing of the metal sample will be effected in an electrolytic cell and an electrolyte consisting of an aqueous solution of boric acid tetrahydrate or an aqueous solution of 0.4% nitric acid may be used. In the anodizing step the anode would be formed of the metal sample or pellet of tantalum or niobium and an oxide sheet of the metal would form the cathode.

Typical equations for tantalum and niobium reaction would be as follows:

$$5TaC + Ta_2O_5 = 2Ta + 5CO$$
$$5NbC + Nb_2O_5 = 7Nb + 5CO$$

The above equations apply also for carbon removal if the sample is coated with a mixture of the oxide powders but applying an oxide film by anodizing affords better results since, with a powder coating, the mean distance between any carbon and any $Ta_2O_5$ or $Nb_2O_5$ will be much greater than with an intimate film of the oxide.

It is preferable for efficient carbon removal that a stoichiometric excess of the oxide be employed during the anodizing step but this presents no problem since the oxide is highly volatile and readily removed at the high temperatures used during the vacuum treatment.

The following tables are provided to show the changes in current leakage of a tantalum sample treated according to this invention wherein a forming voltage of 50 v. DC and a test of 40 v. DC were used.

TABLE I.—RESULTS ON CARBON-BEARING FOIL WHICH WAS SOLVENT CLEANED ONLY

| Carbon Content | Leakage current | | 120 c.p.s. | | 1,000 c.p.s. | |
|---|---|---|---|---|---|---|
| | 1 min. | 2 min. | Capacit. farad | Dissip. factor, percent | Capacit. farad | Dissip. factor, percent |
| Parts per million: | | | | | | |
| 30 | 2.2 | 2.0 | 5.7 | 1.1 | 5.7 | 3.3 |
| 100 | 100.0 | 120.0 | 5.9 | 1.2 | 5.8 | 5.0 |
| 130 | 280.0 | 440.0 | 5.4 | 1.7 | 5.5 | 5.0 |

TABLE II.—RESULTS ON CARBON-BEARING FOIL AFTER RIGOROUS HF CLEANING

| Carbon Content | Leakage current | | 120 c.p.s. | | 1,000 c.p s. | |
|---|---|---|---|---|---|---|
| | 1 min. | 2 min. | Capacit. farad | Dissip. factor, percent | Capacit. farad | Dissip. factor, percent |
| Parts per million: | | | | | | |
| 30 | 1.3 | 1.0 | 6.1 | 1.3 | 6.0 | 3.2 |
| 100 | 1.0 | 0.9 | 6.7 | 1.6 | 6.0 | 3.2 |
| 130 | 1.5 | 1.2 | 6.3 | 1.8 | 6.3 | 3.2 |

Calculations based on 130 carbon parts per million of Table II indicated that a 6 v. DC oxide film would supply sufficient oxygen to remove carbon. Since the tantalum oxide is volatile at high temperatures, a 10 v. DC film was applied to the samples and they were heated in vacuo for 30 minutes at 1850° C. and then 30 minutes at 2150° C. After this treatment all samples, previously reported at 30, 100, and 130 p.p.m. carbon showed no detectable amount of carbon.

TABLE III.—RESULTS ON CARBON-FREE FOIL

| Carbon Content | Leakage current | | 120 c.p.s. | | 1,000 c.p.s. | |
|---|---|---|---|---|---|---|
| | 1 min. | 2 min. | Capacit. farad | Dissip. factor, percent | Capacit. farad | Dissip. factor, percent |
| Parts per million: Not detectable: | .06 | .06 | 4.4 | 1.3 | 4.3 | 4.1 |
| | .12 | .08 | 4.4 | 1.5 | 4.3 | 4.3 |
| | .14 | .08 | 4.4 | 1.2 | 4.3 | 3.5 |

Obviously many modifications and variations of the present invention are possible in the light of the above teachings. It is therefore to be understood that, within the scope of the appended claims, the invention may be practiced otherwise than as specifically described.

I claim:
1. The method of purifying natural carbon containing metals of the group consisting of tantalum and niobium which comprises,
   (a) anodizing the metal in the presence of an oxide of the metal to form a film thereon of the oxide of the metal,
   (b) heating the anodized metal in a vacuum at a temperature above 1850° C. for about 30 minutes, and
   (c) continuing the heating at 2100° C. for about 30 minutes to react the carbon with the oxide film for removing substantially all of the carbon.

2. The method of conditioning natural carbon containing metals of the group consisting of tantalum and niobium for use as electrical components having a minimum of current leakage which comprises,
   (a) treating the natural metal by means of solvent and acid to effect a surface cleaning,
   (b) anodizing the treated metal in the presence of an oxide of the metal to apply a film thereon of the oxide of the metal,
   (c) heating the anodized metal in a vacuum at a temperature above 1850° C. for about 30 minutes, and
   (d) continuing the heating at 2100° C. for about 30 minutes to react the carbon with the oxide film for removing substantially all the carbon.

References Cited
UNITED STATES PATENTS 3,222,751  12/1965  Fuss _____ 29—25.31
3,282,807  11/1966  Burnham _____ 204—37
3,299,326  1/1967  Gluyas et al. _____ 317—230

JOHN H. MACK, Primary Examiner

W. B. VAN SISE, Assistant Examiner